Figure 3:
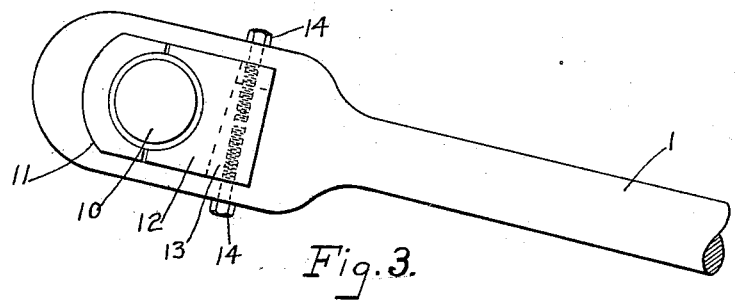

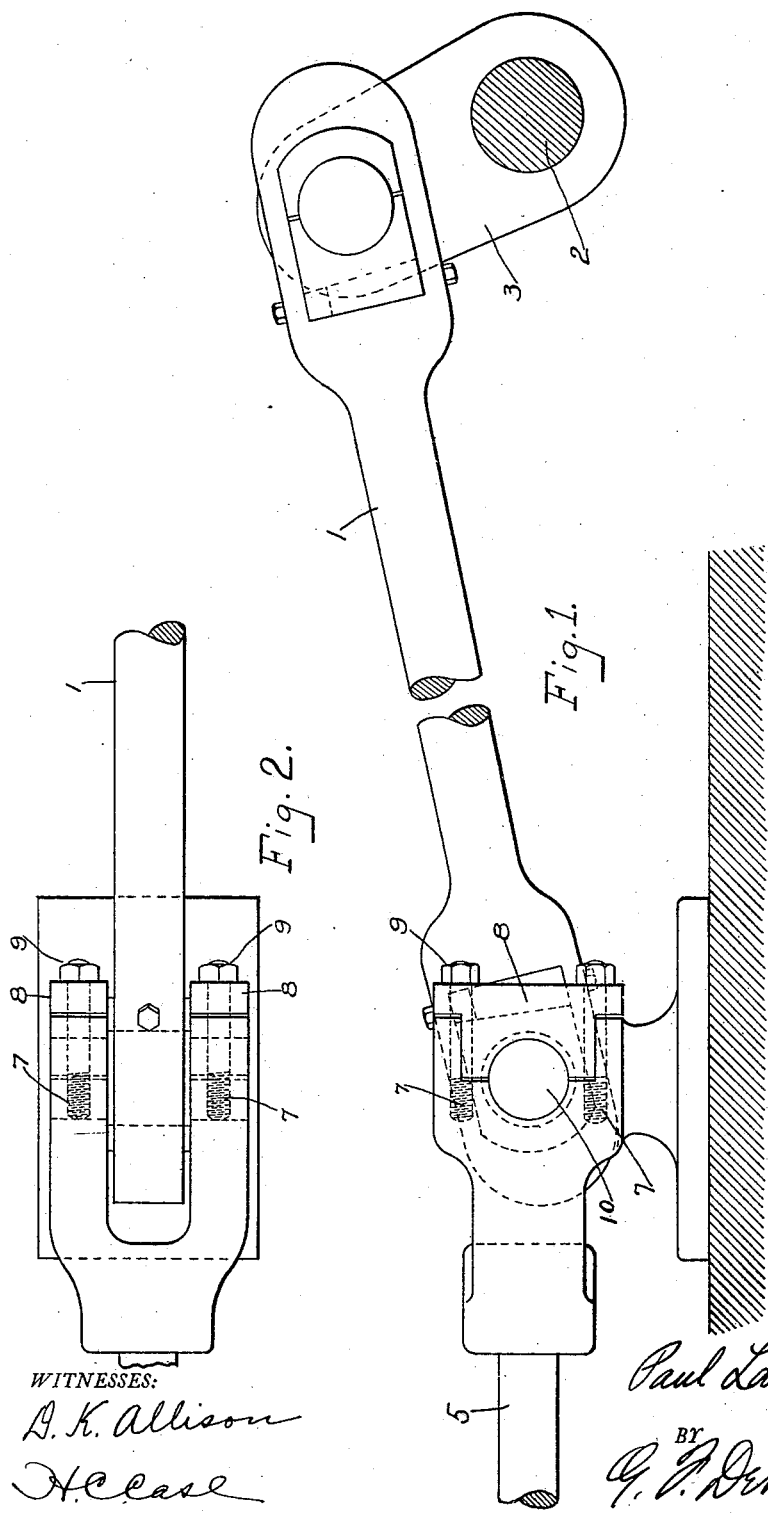

No. 873,561.

PATENTED DEC. 10, 1907.

P. LANGER.
CROSS HEAD.
APPLICATION FILED APR. 7, 1906.

2 SHEETS—SHEET 2.

WITNESSES:
D. K. Allison
H. Case

Paul Langer INVENTOR
BY G. P. DeWein ATTORNEY.

UNITED STATES PATENT OFFICE.

PAUL LANGER, OF MILWAUKEE, WISCONSIN.

CROSS-HEAD.

No. 873,561.	Specification of Letters Patent.	Patented Dec. 10, 1907.

Application filed April 7, 1906. Serial No. 310,423.

*To all whom it may concern:*

Be it known that I, PAUL LANGER, a subject of the Emperor of Austria-Hungary, residing at Milwaukee, in the county of Milwaukee and State of Wisconsin, have invented certain new and useful Improvements in Cross-Heads, of which the following is a specification.

This invention relates to means for pivotally connecting parts and is particularly applicable to means for connecting the piston rod of gas engines, steam engines, compressors, pumps, etc., to the connecting rod, whereby the two may be disconnected from the cross-head or the like without removing the pin from its bearing or affecting the adjustment thereof. This is of special importance in such engines, especially gas engines, in which the frame of the engine is subjected to sudden and enormous strains and where, in order to disconnect the connecting rod from the cross head, it has been customary to provide the frame with a large cut-away portion to permit the removal of the cross-head pin sidewise, as to the engine, and longitudinally as to the pin. This prior construction results in a very material weakening of the frame and it is desirable to have the frame as strong as possible. It further results in spoiling the adjustment of the pin in its journal box or brasses on the connecting rod. It is of the utmost importance in order to secure easy running, that the brasses shall grasp the pin rather tightly but that they shall not be tight enough to cause heating. After the proper adjustment of the brasses upon the pin has been secured, the brasses should not be disturbed until they have worn enough to require a readjustment. A comparatively long time will intervene between such adjustments, provided the pin and brasses are kept properly lubricated. With gas engines it has been found to be practically as economical to use uncleansed gases from blast furnaces, etc., (the larger particles of dust having been removed by the action of some kind of a separator) as to attempt to cleanse the gases thoroughly, and where gases are so used, it becomes necessary to dismantle the engines at frequent intervals to clean the cylinders of accumulated deposits, and these cleansing periods will occur much more frequently than the times when it is necessary to adjust the brasses for wear. It is the object of this invention to provide a connection between a connecting rod and a piston rod or cross-head of such a nature that, while said connection may be readily broken and the two parts disconnected, the re-assembling of the parts is accomplished by simply clamping the ends of the pin in their seats on the cross-head. It takes considerable time to secure an accurate and delicate adjustment in the journal box, and if it is necessary to disarrange the adjustment every time the connecting rod is detached from the cross head, a large amount of time and labor are lost which may be saved by utilizing this invention. By this invention the frame may be made as strong as desired and the adjustment of the pin and journal box, when once secured, need never be disturbed.

The construction will be readily understood from the following description, taken in connection with the accompanying drawings, in which,—

Figures 4, 5:
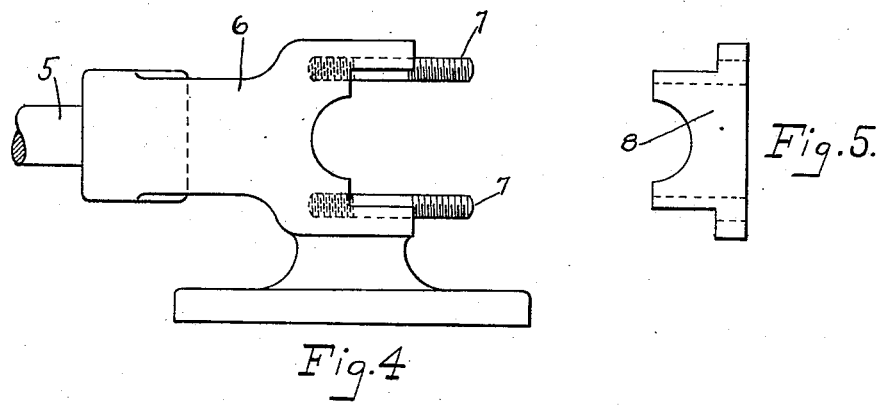
Figure 6:
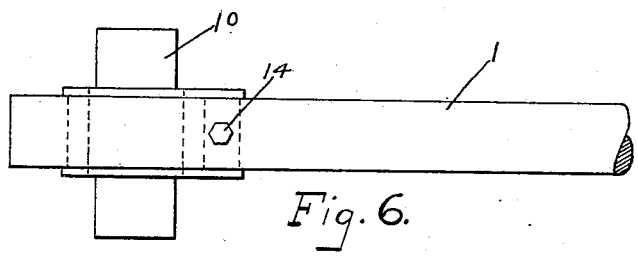

Figure 1 is a side elevation of my improved cross head and the parts in connection with which it is used. Fig. 2 is a plan view of the cross head. Figs. 3, 4, and 5 are side elevations of the parts as seen when detached. Fig. 6 is a plan view of the end of the detached connecting rod.

The drawings illustrate one end of the piston rod 5, which is attached by my improved cross head to the connecting rod 1, the latter being journaled in any suitable manner to the crank 3 on the shaft 2. The connecting rod 1 carries a journal box made up of two parts 11, 12, and a wedge block 13 adapted to be moved by the screw bolts 14, 14, to adjust the journal box on the cross head pin 10. When this adjustment is once secured, the connecting rod and pin may be disconnected from and connected to the piston rod at will without removing the pin 10 from the journal box and without disarranging the adjustment previously secured. To accomplish this, the cross head 6 on the end of the piston rod 5 is provided with a cap 8, removable therefrom, in the direction of piston rod movement or at an angle thereto, rendering the pin free for removal. This cap may be secured thereto in any suitable manner, as, for instance, by stud bolts 7, 7, having nuts 9, 9. The ends of the cross-head pin 10 are rigidly held in the head 6 and may, if desired, be keyed thereto to prevent any possible rotation. There in no adjustment of the pin in the head 6 and no care need be exercised in connecting these parts other than securing the cap tightly in place. When it is found necessary to disconnect the parts, the nuts 9, 9 and the cap 8 are removed and the connecting rod 1 carrying the pin 10 may then be separated from the piston rod without changing the adjustment previously secured in the journal box 11, 12. Furthermore, should it be found necessary at any time to regulate or change in any way the adjustment of the journal box, the pin may be readily disconnected from the cross-head and the end of the connecting rod may be elevated to a point where a workman may easily get at it.

What I claim as my invention and desire to secure by Letters Patent, is:

1. The combination with a bifurcated cross-head of a connecting rod, a pin inserted in said rod and upon which said rod is adapted to oscillate, caps and bolts to bind said pin between said caps and said cross-head.

2. The combination with a bifurcated cross-head of a connecting rod, a pin inserted in said rod and upon which said rod is adapted to be oscillated, caps and bolts to bind said pin between said caps and said cross-head, the length of said pin being substantially not greater than the width of the bifurcated end of said cross-head.

In testimony whereof I affix my signature in presence of two witnesses.

PAUL LANGER.

Witnesses:
G. F. DE WEIN,
ELLA BRICKELL.